(12) United States Patent
Kline et al.

(10) Patent No.: US 8,271,377 B2
(45) Date of Patent: Sep. 18, 2012

(54) SYSTEM AND METHOD FOR CREATING A MARKET MAP IN AN ELECTRONIC TRADING ENVIRONMENT

(75) Inventors: Robert J. Kline, Chicago, IL (US); Michael J. Burns, Riverside, IL (US); Robert A. West, Chicago, IL (US)

(73) Assignee: Trading Technologies International Inc., Chicago, IL (US)

( * ) Notice: Subject to any disclaimer, the term of this patent is extended or adjusted under 35 U.S.C. 154(b) by 0 days.

(21) Appl. No.: 13/414,213

(22) Filed: Mar. 7, 2012

(65) Prior Publication Data

US 2012/0166329 A1 Jun. 28, 2012

Related U.S. Application Data

(63) Continuation of application No. 13/174,915, filed on Jul. 1, 2011, now Pat. No. 8,160,954, which is a continuation of application No. 12/508,053, filed on Jul. 23, 2009, now Pat. No. 8,019,674, which is a continuation of application No. 11/416,452, filed on May 2, 2006, now Pat. No. 7,584,142, which is a continuation of application No. 10/338,370, filed on Jan. 8, 2003, now Pat. No. 7,574,397.

(51) Int. Cl.
*G06Q 40/00* (2012.01)
(52) U.S. Cl. ............................................ 705/37; 705/35
(58) Field of Classification Search .................. 715/700, 715/764; 705/37
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,689,651 A | 11/1997 | Lozman | |

(Continued)

FOREIGN PATENT DOCUMENTS

EP 1067471 A1 1/2001

(Continued)

OTHER PUBLICATIONS

APT Brochure, LIFFE Exchange, circa 1990.

(Continued)

*Primary Examiner* — Samica L Norman
(74) *Attorney, Agent, or Firm* — McDonnell Boehnen Hulbert & Berghoff LLP

(57) ABSTRACT

A market map interface displays market information and trader-related information associated with at least two tradable objects. In one embodiment, the at least two graphical interfaces may be linked, and a user may define one or more adjustment parameters to be used to adjust the view of information being displayed via the linked graphical interfaces. For instance, a user may initiate repositioning of one of the linked graphical interfaces, thus, effectively, causing other linked graphical interfaces to be repositioned according to the defined adjustment parameters.

19 Claims, 6 Drawing Sheets

U.S. PATENT DOCUMENTS

| | | | |
|---|---|---|---|
| 5,768,158 | A | 6/1998 | Adler et al. |
| 5,774,877 | A | 6/1998 | Patterson, Jr. et al. |
| 5,793,301 | A | 8/1998 | Patterson, Jr. et al. |
| 5,797,002 | A | 8/1998 | Patterson, Jr. et al. |
| 5,845,266 | A | 12/1998 | Lupien et al. |
| 5,915,245 | A | 6/1999 | Patterson, Jr. et al. |
| 5,924,082 | A | 7/1999 | Silverman et al. |
| 5,924,083 | A | 7/1999 | Silverman et al. |
| 5,946,667 | A | 8/1999 | Tull, Jr. et al. |
| 5,963,923 | A | 10/1999 | Garber |
| 6,012,046 | A | 1/2000 | Lupien et al. |
| 6,014,643 | A | 1/2000 | Minton |
| 6,035,287 | A | 3/2000 | Stallaert |
| 6,098,051 | A | 8/2000 | Lupien et al. |
| 6,131,087 | A | 10/2000 | Luke et al. |
| 6,134,535 | A | 10/2000 | Belzberg |
| 6,188,403 | B1 * | 2/2001 | Sacerdoti et al. ............ 715/764 |
| 6,195,647 | B1 | 2/2001 | Martyn et al. |
| 6,211,880 | B1 | 4/2001 | Impink, Jr. |
| 6,272,474 | B1 | 8/2001 | Garcia |
| 6,278,982 | B1 | 8/2001 | Korhammer et al. |
| 6,282,521 | B1 | 8/2001 | Howorka |
| 6,408,282 | B1 | 6/2002 | Buist |
| 6,766,304 | B2 | 7/2004 | Kemp, II et al. |
| 6,993,504 | B1 * | 1/2006 | Friesen et al. .................. 705/37 |
| 7,155,410 | B1 * | 12/2006 | Woodmansey et al. ......... 705/37 |
| 7,574,397 | B1 | 8/2009 | Kline et al. |
| 7,584,142 | B1 | 9/2009 | Kline et al. |
| 8,019,674 | B1 | 9/2011 | Kline et al. |
| 2002/0023038 | A1 | 2/2002 | Fritsch et al. |
| 2002/0035534 | A1 | 3/2002 | Buist et al. |
| 2002/0055899 | A1 | 5/2002 | Williams |
| 2002/0059129 | A1 | 5/2002 | Kemp, II et al. |
| 2002/0099644 | A1 | 7/2002 | Kemp, II et al. |
| 2002/0120551 | A1 | 8/2002 | Jones, III |
| 2002/0138401 | A1 | 9/2002 | Allen et al. |
| 2003/0004853 | A1 | 1/2003 | Ram et al. |
| 2003/0009411 | A1 | 1/2003 | Ram et al. |
| 2003/0023542 | A1 | 1/2003 | Kemp, II et al. |
| 2003/0200167 | A1 | 10/2003 | Kemp, II et al. |
| 2007/0240053 | A1 * | 10/2007 | Lutnick et al. ................ 715/700 |
| 2011/0264579 | A1 | 10/2011 | Kline et al. |

FOREIGN PATENT DOCUMENTS

| | | | |
|---|---|---|---|
| WO | 91/14231 | A1 | 9/1991 |
| WO | 95/26005 | A1 | 9/1995 |
| WO | 98/49639 | A1 | 11/1998 |
| WO | 99/19821 | A1 | 4/1999 |
| WO | 99/30259 | A1 | 6/1999 |
| WO | 99/53424 | A1 | 10/1999 |
| WO | 00/52619 | A1 | 9/2000 |
| WO | 00/62187 | A2 | 10/2000 |
| WO | 00/62187 | A3 | 10/2000 |
| WO | 00/65510 | A1 | 11/2000 |
| WO | 0108057 | A1 | 2/2001 |
| WO | 01/16830 | A1 | 3/2001 |
| WO | 01/16852 | A2 | 3/2001 |
| WO | 01/22315 | A2 | 3/2001 |
| WO | 01/22315 | A3 | 3/2001 |
| WO | 01/65403 | A2 | 9/2001 |
| WO | 01/88808 | A1 | 11/2001 |
| WO | 02/15461 | A2 | 2/2002 |
| WO | 02/29686 | A1 | 4/2002 |
| WO | 01/16852 | A8 | 6/2002 |
| WO | 02/48945 | A1 | 6/2002 |
| WO | 02/059815 | A1 | 8/2002 |
| WO | 02/069226 | A2 | 9/2002 |
| WO | 02/093325 | A2 | 11/2002 |
| WO | 03077061 | A2 | 9/2003 |
| WO | 03/090032 | A2 | 10/2003 |
| WO | 03/90032 | A3 | 10/2003 |
| WO | 03/77061 | A3 | 4/2004 |

OTHER PUBLICATIONS

Trading Screen, INTEX of Bermuda, circa 1984.
Weber, Information Technology in the Major International Financial Markets, Apr. 7, 1993.
Trading Screen, TIFFE Exchange, circa 1989-1990.
Trading Screen, MEFF Exchange, circa 1990.
Cavaletti, Order Routing Article, Futures Magazine, Feb. 1997.
Aurora Article, CBOT, circa 1989.
One Click Trading Options, Trading Technologies, circa 1998.
Trading Screen, SWX Exchange, circa 1990.
Expanding futures and options trading around the world, around the clock, Globex, circa 1989.
Hansell, The computer that ate Chicago, Institutional Investor, Feb. 1989.
Globex Report: an update on the CME Global electronic exchange, Feb. 10, 1989.
NYMEX Access Documents, New York Mercantile Exchange, Feb. 28, 1992.
Cats Traders' Manual, toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, the last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
Kharaouf, "A Trading Room With a View", Futures Magazine, vol. 27, Nov. 1998, p. 66-71.
www.tradingtechnologies.com/products/xtrade_full.html (viewed May 22, 2001) Jun. 9, 2000.
USPTO Presentation, NASDAQ, Nov. 8, 2001.
Credo Reference—definition of the term "reposition" Webpage [online], The Penguin English Dictionary, Merriam-Webster, Inc. and Longman Group Ltd., 1986 and Penguin Books, 2000. [Retrieved on Oct. 16, 2008] from the Internet: http://xreferplus.com/entry.jsp?xrefid+11680864secid=&hh=16/10/2008.

* cited by examiner

SYSTEM AND METHOD FOR CREATING A MARKET MAP IN AN ELECTRONIC TRADING ENVIRONMENT

CROSS-REFERENCE TO RELATED APPLICATIONS

This application is a continuation of U.S. patent application Ser. No. 13/174,915 filed Jul. 1, 2011, now U.S. Pat. No. 8,160,954, which is a continuation of U.S. patent application Ser. No. 12/508,053 filed Jul. 23, 2009, now U.S. Pat. No. 8,019,674, which is a continuation of U.S. patent application Ser. No. 11/416,452 filed May 2, 2006, now U.S. Pat. No. 7,584,142, which is a continuation of U.S. patent application Ser. No. 10/338,370 filed Jan. 8, 2003, now U.S. Pat. No. 7,574,397, the contents of which are fully incorporated herein by reference.

FIELD OF INVENTION

The present invention is directed towards electronic trading. More specifically, the present invention is directed towards providing a tool for displaying trader-related data in combination with market data related to one or more tradable objects.

BACKGROUND

Over the years, institutions have existed that allowed people to buy and sell tradable objects from one another. Since the advent of traditional trading methods, the basic manner in which such trading has been conducted has remained essentially the same. However, recent technological advances have provided for the evolution of trading methods from a manually intensive process to technologically enabled electronic platforms. The rapid increase in the number of people performing trades electronically has continued to account for more and more of the total percentage of transactions in the market. In fact, what was previously seen as a supplement to the traditional pit trading, now, electronic trading is expected to continue to transform the trading process as modern technology advances.

Many exchanges throughout the world now support electronic trading. Electronic trading has made it possible for an increasing number of people to actively participate in a market at any given time. The increase in the number of potential market participants has advantageously led, among other things, to a more competitive market and greater liquidity.

Exchanges that support electronic trading are generally based on a host, one or more computer networks, and clients. In general, the host includes one or more centralized computers to form the electronic heart. Its operations typically include order matching, maintaining order books and positions, price information, and managing and updating a database that records such information. The host is also equipped with an external interface that maintains uninterrupted contact to the clients and possibly other trading-related systems.

Typically, market participants link to the host through one or more networks. A network is a group of two or more computers linked together. There are many types of networks such as local area networks and wide area networks. Networks can also be characterized by topology, protocol, and architecture. However, any type of network configuration can be used as an electronic trading environment. For example, some market participants may link to the host through a direct connection such as a T1 or ISDN. Alternatively, some participants may link to the exchange through direct connections and through other common network components such as high-speed servers, routers, gateways, and so on.

Regardless of the way in which a connection is established, software running on the clients allows people to log onto one or more exchanges and participate in one or more markets. Some clients run software that creates specialized interactive trading screens. In general, the trading screens enable people to enter orders into the market, obtain market quotes, and monitor positions. The range and quality of features available on such screens vary according to the specific software application being run.

The success of a trader who trades in a competitive electronic trading environment depends on many factors. One of the factors is how fast a trader can make a trade. The faster and more flexible that a trader can trade, the less likely it will be that the trader will miss the trader's price and the more likely the trader will make money.

Another important factor is the ability of a trader to view market information, e.g., a market trend, related to one or more tradable objects that the trader is trading, or relative positions between two or more tradable objects. Many traders view market information using charts that display market trend information related to a particular tradable object. To view such charts, however, traders have to open one or more windows in addition to a trading interface. Such a method of displaying information may not be fully beneficial to a trader especially when the trader is trading a plurality of tradable objects at the same time and simultaneously wants to view multiple charts corresponding to the tradable objects. Further, using such a method, a trader will not be able to quickly and efficiently determine relationships between the displayed tradable objects. If multiple charts do not fit on a trader's screen, a trader is forced to switch between the charts and/or the trading interface. Such an embodiment may be to detriment of a trader, because, while the trader opens and closes multiple charts, the trader may miss critical shifts in one or more markets in which the trader participates. Further, using such charts, it is difficult for a trader to correlate the trader's current positions or his/her market activities with market information provided on such charts. This task becomes even more burdensome to a trader who is trading multiple tradable objects and who at the same time is trying to view market information and monitor his/her trading positions.

Additionally, if a trader is not even using charts, but trades multiple tradable objects at the same time, the trader might experience difficulties to simultaneously view information related to all of these tradable objects due to screen space limitations. Thus, once again, a trader might get caught switching between interfaces to view data related to tradable objects that he/she is currently trading, while possibly missing important market swings related to other tradable objects.

Thus, it is still desirable for electronic trading applications to offer tools that can assist a trader in trading in electronic trading environments, help the trader make trades at the most favorable prices in a speedy and accurate manner, while allowing the trader to conveniently view any desirable information.

BRIEF DESCRIPTION OF THE DRAWINGS

Example embodiments of the present invention are described herein with reference to the following drawings, in which.

DETAILED DESCRIPTION OF THE PREFERRED EMBODIMENT(S)

For certain trading strategies, traders may be interested in monitoring and participating in markets for two or more tradable objects. Known trading applications have limited capabilities to address this interest. For example, market information related to one tradable object may be displayed in a trading interface in a first trading window and information on a second tradable object may be displayed in a second trading window. Using such known trading applications, it may take a long time for a trader to discern the relationship between the tradable objects.

Thus, it is beneficial to display market information and trader-related information for two or more tradable objects in a manner that allows a trader to quickly monitor his position as the market fluctuates. According to one preferred embodiment, the market information and trader-related information associated with two or more tradable objects are displayed in relation to one or more common static axes, and create what is referred to hereinafter as a "market map." Using the market map, a trader can view, among other parameters, his/her working orders and complete position in relation to market information associated with two or more tradable objects being traded by the trader.

Further, according to another preferred embodiment, a trader may believe that there is a relationship between two or more tradable objects, information related to which, is displayed via the market map. In such an embodiment, the trader may link two or more such tradable object interfaces being displayed via the market map to create one or more linked tradable object groups. Once the tradable object interfaces are linked, the trader may define one or more adjustment parameters, such as offsets, equations, or formulas, based on his/her perception of a relationship between the linked tradable objects. Based on the defined adjustment parameters, as will be described in greater detail below, and, for example, upon receiving a predetermined user input, data related to one or more linked tradable objects are displayed via the graphical interfaces and may be adjusted relatively to one another. In the example embodiment described hereinafter, adjustment of one or more graphical interface refers to changing of relative views or positions of the graphical interfaces associated with the tradable objects.

While the present invention is described herein with reference to illustrative embodiments for particular applications, it should be understood that the present invention is not limited thereto. Those having ordinary skill of art will recognize that many additional modifications and embodiments are possible as well.

Figure 1:
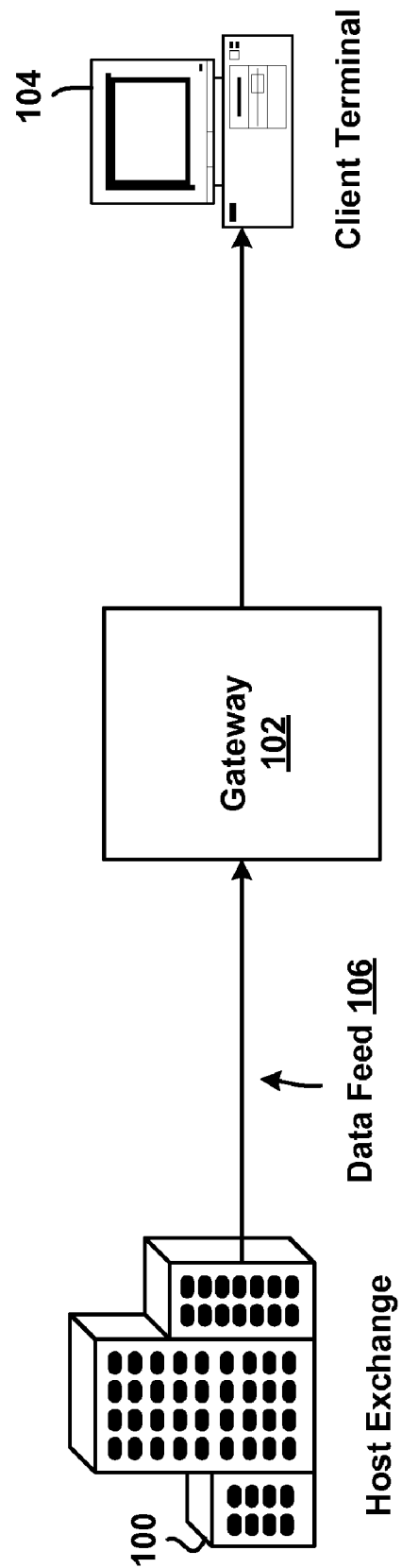
FIG. 1 is an example of a network configuration for a communication system utilized to access one or more exchanges.

FIG. 1 shows an example system that may be used to implement network connections between an exchange and client terminals. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

Referring back to FIG. 1, the illustrated system includes a host exchange 100, a gateway 102, and a client terminal 104. It should be understood that even though the example system illustrates only one client terminal 102 communicating with a single host exchange 100, the client terminal 102 could also communicate with more than one host exchange via the gateway 102 or other gateways corresponding to each host exchange. Further, it should be understood that the example system is not limited to a single client terminal. In an alternative embodiment, a trading house including a plurality of client terminals may connect to the host exchange 100 via the gateway 102.

The host exchange 100 may include the Chicago Board of Trade ("CBOT"), the New York Stock Exchange ("NYSE"), the Chicago Mercantile Exchange ("CME"), the Xetra (a German stock exchange), or the European derivatives market ("Eurex"). However, it should be understood that the exchanges could also include any other existing or later developed exchanges. Further, it should be understood that the present invention is not limited to any particular network architecture or trading application, but rather may be applied with utility on any client device in any network that can be used for electronic trading. Furthermore, the invention is not limited to a completely electronic trading environment where orders are sent to an electronic matching engine. For example, the invention could be utilized with an electronic trading application, which sends orders electronically to a terminal where a person (e.g., a floor broker) executes those orders in a traditional open outcry trading floor.

The host exchange 100 connects to the client terminal 104 via the gateway 102. The gateway 102, as is known in the art, may include one or more computers, or software programs, and receives information from the host exchange 100 and sends the information down to the client terminal 104. Preferably, the gateway 102 receives data from the host exchange 100 and converts the received data to a format compatible with the protocols used on the client terminal 104. Alternatively, the conversion could be performed at the client terminal 104.

The host exchange 100 provides market information to the client terminal 102, and may relay this information, or a portion thereof, collectively called a data feed 106, over a network to market participants at the client terminal 104. A data feed from one exchange may contain different information representing different tradable objects than another data feed from a second exchange. In one embodiment, a data feed may include market information related to all tradable objects being traded at the host exchange 100. In such an embodiment, when the client terminal 104 receives such a data feed, a trading application on the client terminal 104 may extract from the received data feed information related to one or more tradable object selected by a trader at the client terminal 104. Alternatively, the gateway 102 could be configured to extract the information related to tradable objects selected by a particular trader at the client terminal 104, and could send only the relevant information to the client terminal 102. Further, alternatively, the host exchange 100 may have knowledge of tradable object(s) that were selected by a trader at the client terminal 104, and may provide to the client terminal 104 only market data related to the selected tradable objects.

As used herein, the term "tradable object" refers simply to anything that can be traded with a quantity and/or price. It includes, but is not limited to, all types of tradable objects such as financial products, which can include, for example, stock options, bonds, futures, currency, and warrants, as well as funds, derivatives, and collections of the foregoing, and all types of commodities, such as grains, energy, and metals. The tradable object may be "real," such as products that are listed by an exchange for trading, or "synthetic," such as a combination of real products that is created by a trader. Also, a tradable object could actually be a combination of other tradable objects, such as a class of tradable objects.

The data feed 106 may include information relating to prices and quantities of one or more tradable objects. For example, the data feed 106 could provide data corresponding to quantities at inside market prices and/or data corresponding to quantity at different prices. The inside market is the highest bid price ("HBP") and the lowest ask price ("LAP") for a tradable object. Data feeds from some exchanges may also provide data related to the market depth. The market depth of a tradable object is each available pending bid and ask quantity (or any aggregation or combination thereof), entered at a particular price. The extent of the market depth available to a trader depends on the host exchange. Some exchanges provide an infinite market depth, while others provide only quantities associated with the inside market and some may provide no market depth.

The client terminal 104 may include any computing terminal, such as a personal computer, a handheld device, or any other currently existing or later developed computing terminals. Further, it should be understood that the client terminal 104 may connect to the gateway 102 via wireless communication links, wireline communication links, or a combination thereof. In general, according to the example embodiments described herein, the client terminal 104 is a computer that allows a trader to participate in the market hosted at the exchange 100, and uses software that creates specialized trading screens on the client terminal. The range and quality of features available to the trader on his or her client terminal's screen may vary according to the specific software application being run on the client terminal 106. Among other functional features, a trading screen being run on the client terminal 106 may enable traders to enter and execute orders, obtain market quotes, and monitor positions. However, it should be understood that, in addition to interactive trading screens, the client terminal 104 may also run automated non-interactive types of trading applications.

A commercially available trading application that allows a trader to trade in a system like the one shown in FIG. 1 is X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. However, the preferred embodiments are not limited to any particular product that performs translation, storage and display functions.

Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. application Ser. No. 10/125,894, entitled "Trading Tools for Electronic Trading," filed on Apr. 19, 2002, the contents of which are incorporated herein by reference.

Market Map

According to one example embodiment, a client terminal consists of one or more computers (or software applications) that allow a trader to participate in the market hosted at the exchange. More specifically, the client terminal uses one or more trading applications that create specialized trading interfaces. Such trading interfaces, among other functions, enable traders to enter and execute orders and monitor positions in a fast and efficient manner. Additionally, as will be described in reference to the subsequent figures, a trader may activate a market map interface that allows him/her to view market information associated with one or more tradable objects as well as trader-related information associated with these tradable objects.

A market map may be displayed in a format of a window interface that, in turn, may display information related to a plurality of tradable objects. According to one embodiment, market information and trader-related information associated with a tradable object are displayed in relation to a static axis. Further, the displayed information may be repositioned in relation to information associated with another tradable object. For instance, information related to a tradable object and displayed in relation to one static axis may be repositioned in relation to information displayed in relation to a second axis based on one or more user configurable adjustment parameters.

It should be noted that the static axis, such as the static axis of prices is not necessarily immovable with respect to its physical position on the display screen, but rather may be moved to various different positions on the display. The user may use a mouse or other input device, for example, to reposition static axis of prices to a different location on the display screen, such as by scrolling the static axis of prices from one side of the display screen to the other side of the display screen. In another example, the user may vary which portion of the static axis of prices is displayed, such as by scrolling up or down the axis or by entering a repositioning command.

Figure 2:
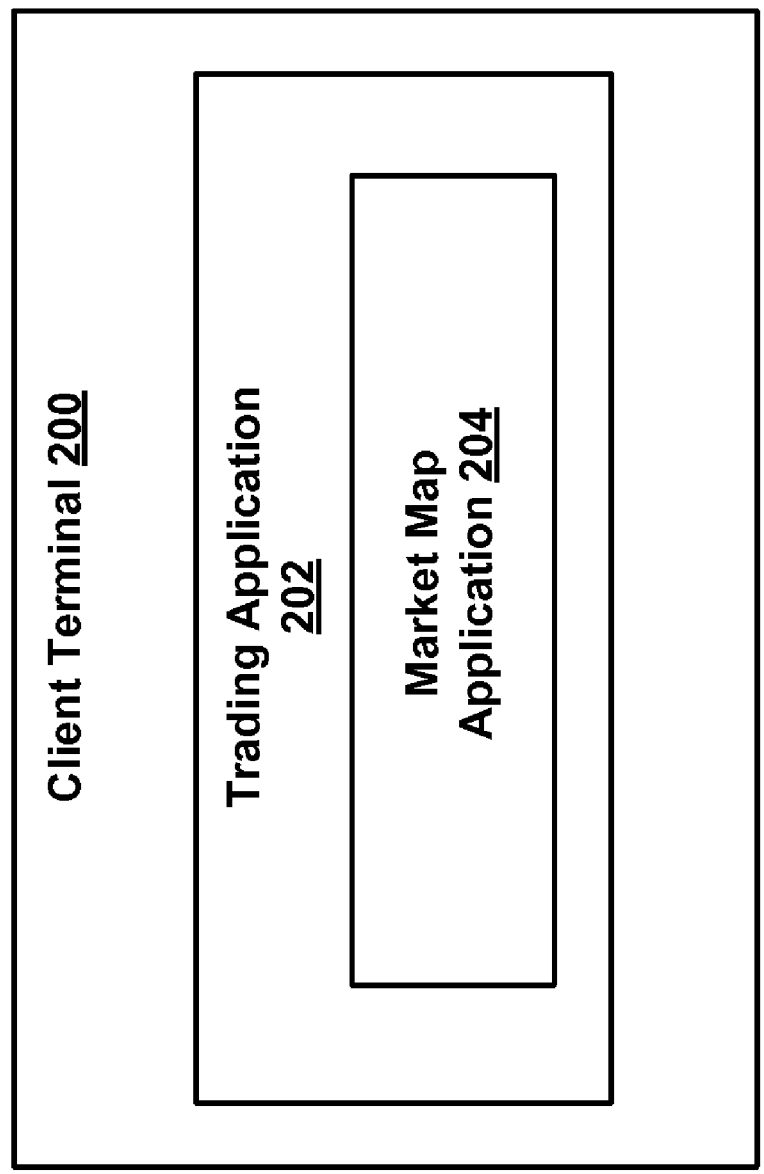
FIG. 2 is a simplified block diagram of a client terminal that can be used in example embodiments.

FIG. 2 is a simplified block diagram of a client terminal 200 that may be used according to one embodiment. The client terminal 200 includes a trading application 202 and a market map application 204. As mentioned in the preceding paragraphs, it should be understood that the use of the trading application 202, among other functions, allows a trader to view market data, and enter or cancel trade orders. A commercially available trading application that allows a trader to trade in a system like that shown in FIG. 1 is X_TRADER® from Trading Technologies International, Inc. of Chicago, Ill. that provides an electronic trading interface, MD Trader™. However, it should be understood that different trading application could also be used. The market map application 204 allows a trader to dynamically view a trader's performance and position relative to market data associated with a predetermined tradable object. Additionally, the market map application 204 may allow the trader to view historical data associated with the tradable object. In one embodiment, the market map application 204 may also allow a trader to view market data and trader-related data associated with a plurality of tradable objects being traded by the trader. In such an embodiment, one or more displays of market data and trade-related data may be adjusted relative to one or more linked tradable object interfaces based one or more adjustment parameters specified by a trader. In such an embodiment, a trader may select a tradable object relative to which one or more other displays are adjusted, the embodiments of which will be described in greater detail in reference to subsequent figures.

In one embodiment, the market map application 204 and the trading application 202 may share commonly used information. In an alternative embodiment, the market map application 204 may be a separate and independent application from the trading application 202. Further, it should be understood that even though FIG. 2 illustrates the market map application 204 installed on the client terminal 200, in an alternative embodiment, the market map application 204 could be installed at a server and/or gateway. In such an embodiment, for example, when a trader at the client terminal 200 subscribes to services provided by the market map application 204, a server or a gateway may start monitoring trader's trade-related data associated with one or more tradable objects and correlate the trade-related data with market data associated with those objects for display via the market map interface. In such an embodiment, a gateway or a server may provide market map data to the client terminal 200, and the client terminal 200, upon receipt, may dynamically display the received market map data via a market map interface that will be described in greater detail below.

Further, alternatively, it should be understood that the market map application 204 could be partially installed at a server and/or gateway, and some portions may be installed at the client terminal 200. Such an embodiment may turn out especially beneficial when a client terminal has little processing power or not enough storage space to store algorithms or applications to be used for mapping trader's trade-related data associated with a predetermined tradable object onto market data corresponding to that tradable object. Those skilled in the art will understand that the market map application 204 and the trading application 202 may be stored in a random access memory, a read only memory, a combination thereof, or another storage medium available at the client terminal 200 or at another network entity.

Figure 3:
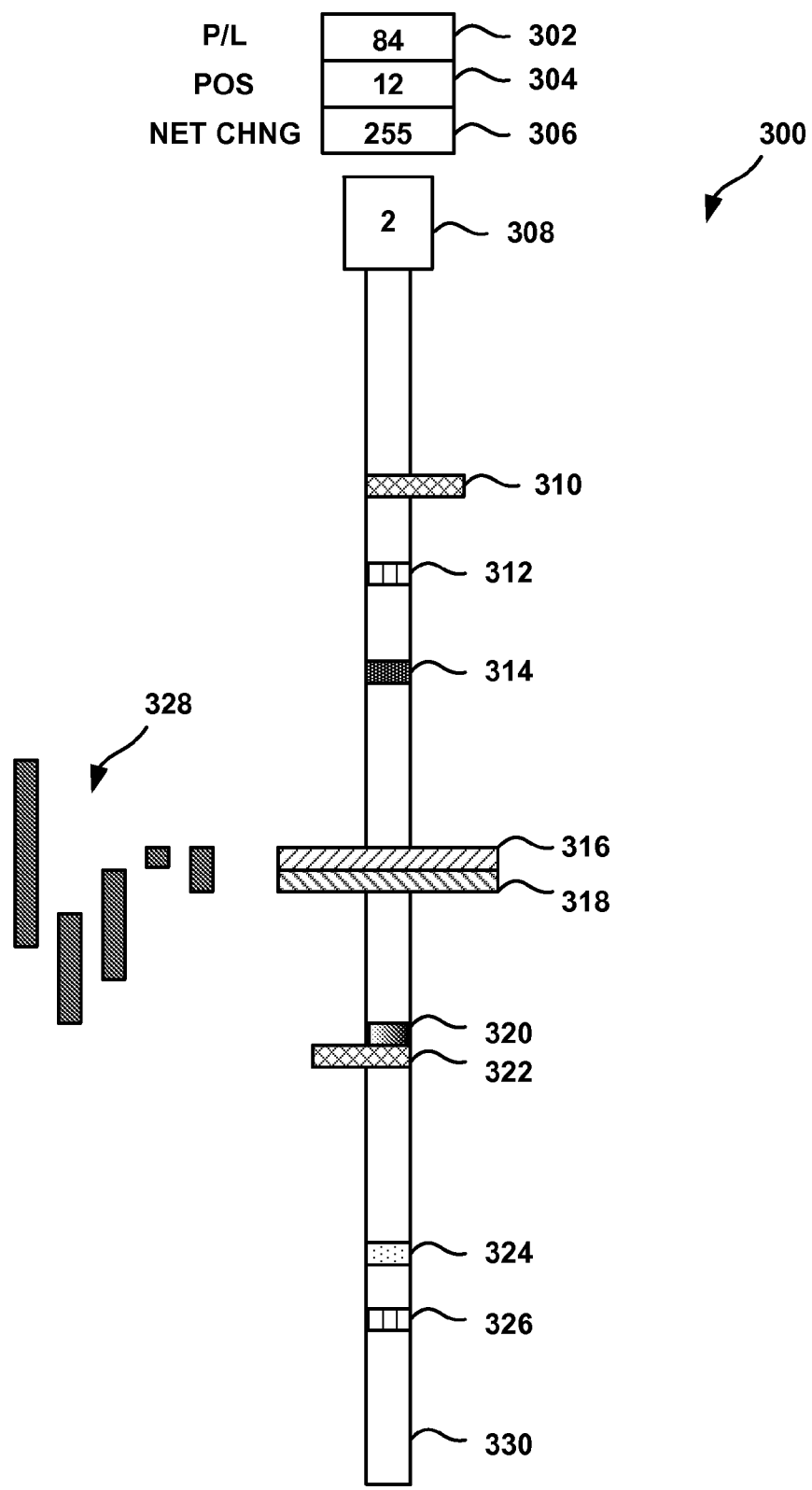
FIG. 3 is a block diagram illustrating one graphical interface that may be displayed via a market map in accordance with one embodiment.

FIG. 3 is a block diagram illustrating a graphical interface 300 associated with a tradable object that may be displayed via a market map according to one embodiment.

The graphical interface 300 displays market information and trader-related information associated with a tradable object. The market information and trader-related information are displayed using a plurality of graphical indicators. It should be understood that the indicators illustrated in FIG. 3 are only example indicators, and any type of graphical indicators could also be used. For example, trader-related indicators and market indicators could be user configurable. According to the embodiment illustrated in FIG. 3, the indicators are displayed in relation to a common static axis 330 that is fixed in relation to the displayed indicators. The indicators, however, can move relative to the static axis 330. The common static axis 330 may be representative of price levels corresponding to each indicator. The embodiment illustrated in FIG. 3 does not display numerical values corresponding to prices. However, it should be understood that, in an alternative embodiment, price levels could be displayed either on the axis or in relation to the axis. Exchanges typically list prices of tradable objects traded in the marketplace in small denominations, such as $1/32$ or $1/64$ of a dollar, or in decimals like 0.01. The smallest such denomination for each tradable object is called a "tick." Alternatively, prices may be displayed as consolidated prices. In one embodiment, market information and trader-related information provided on a market map may be displayed based on tick increments provided by the exchange.

It should be understood that market information indicators and trader-related information indicators may fluctuate logically up and down relative to the axis as the market prices fluctuate. It should be understood that the present invention is not limited to any type of display. For example, market information related to a tradable object and trader-related data may be displayed horizontally relative to a horizontally oriented axis, n-dimensionally, or in any other fashion.

The graphical interface 300 may display a plurality of market information indicators associated with a tradable object, such as a highest traded price indicator 312, a lowest traded price indicator 326, a best ask indicator 316, a best bid indicator 318, and a net change indicator 306. The highest and lowest traded price indicators 312 and 326 correspond to the highest traded price and the lowest traded price of a tradable object during a predetermined period of time such as during a trading day or any other configurable period of time, for example. The best ask indicator 316 and the best bid indicator 318 indicate the inside market level, i.e., the best ask price and the best bid price, respectively. It should be understood that a trader can have the ability to control a graphical representation of each indicator, such as shape or color of each indicator. For example, a trader can configure one color, such as yellow, to be used for the highest traded price indicator 312, and another color, such as purple, to be used for the lowest traded price indicator 326, for instance. Further, it should be understood that each indicator could be displayed in association with a numerical value. For example, in addition to displaying a graphical indicator associated with a highest traded price, a numerical value of the highest traded price could be displayed in association with the indicator.

As illustrated in FIG. 3, the net change indicator 306 displays a net change associated with a closing price, such as the highest closing bid, for example, on one trading day and a closing price of some previous trading day configurable by a user. Therefore, the number displayed in the net change indicator 306 corresponds to a net price movement associated with the tradable object over a specific period of time.

It should be understood that the market information indicators described above are only example indicators and more, fewer, or different indicators could also be used in addition to or instead of the indicators described.

In addition to displaying market-related information associated with the tradable object, the graphical interface 300 may also display trader-related information indicators associated with the tradable object. The trader-related indicators illustrated in FIG. 3 include an average price of open position indicator 324, a working bid indicator 322, a working ask indicator 310, a net position indicator 304, and a trader's performance indicator, e.g., a profit/loss ("P/L") indicator 302.

The indicator 324 is associated with an average price of an open position. A position may be defined as a difference between the number of orders bought (a long position) and the number of orders sold (a short position). A position is open when the number of orders bought and sold is not equal. If these numbers are equal, the trader's position is considered closed. For example, when a trader trades at the exchange, the trader may receive multiple fills for multiple quantities that may be associated with different price levels. The different price levels associated with these multiple fills may be used to determine an average price of an open position, e.g., an average price at which the fills occurred. It should be understood that the average price may be determined in many different ways, and a trader may use his own pre-configured method to determine the average price. The trader can then use this average price to estimate if trading out of a position would result in a gain, loss, or neither a gain nor a loss.

For example, to determine the average price of an open position, a total price of the quantity that has been filled may be divided by the total number of orders either bought or sold, i.e., the trader's current position. For example, if a trader purchased two contracts of a tradable objects, one at a price level 100 and one at a price level 102, the trader would have a long position of two, meaning that the trader would have to sell two contracts in order to close the position. In this example, the average price of an open position is 101 (the number of contracts at 100 (1*100) plus the number of contracts at 102 (1*102), divided by the total number of contracts (2)). FIG. 3 displays the average price indicator 324 on the static axis 330. However, it should be understood that the average price indicator 324 could be displayed in any manner and in any relation to the static axis 330.

The working order indicators 310 and 322 are associated with orders that a trader placed in a market, but which haven't been filled yet, e.g., the system is working on filling the order. Specifically, the working offer indicator 310 corresponds to a working offer order, and the working bid indicator 322 corresponds to a working bid order that was placed by a trader. Alternatively, the indicators 310 and 322 or another set of indicators could be used to indicate, for example, a sell stop or a buy stop, e.g., price levels to sell or buy a certain quantity of a tradable object when the respective stop price level is reached. In addition to the stop price level indicators, buy and sell limit indicators could be displayed as well. In such an embodiment, for instance, when a market reaches a predetermined sell stop level, an order to sell a specific quantity of a tradable object may be automatically placed in the market. However, in a fast moving market, if the market reaches the limit level before the order to sell is filled, the order may be cancelled. Thus, the predetermined quantity of the tradable object may be sold when a sell stop level is reached unless market reaches a predetermined limit level. It should be understood that stop and limit levels may be user configurable, and stop level indicators as well as limit level indicators may be displayed on the graphical interface 300 to indicate where such limit levels have been placed.

Further, a trader may move the working order indicators 310 and 322 to a new desired price, thus, effectively, cancelling the previous order and placing a new order on the market. When the trading application 202 detects that a trader moves a working order indicator to a new position, the trading application 202 may submit a new order at a price level corresponding to the position of the indicator on the axis 330, and also may cancel the previous working order. It should be understood that the process of moving the order to a new price level may be accomplished in many different ways. For instance, a trader may move the indicator to a new position by simply selecting the order indicator and dragging the order to a new price level. It should be understood that when the trader selects the order indicator, information related to the order, such as order quantity and the current price level, may be displayed in relation to the indicator. Similarly, when the trader drags the indicator to a new position, price levels may be displayed in association with the indicator until the indicator reaches a desired price level.

In addition to the working order indicators 310 and 322, the interface 330 may also display a total number of working orders that a trader has in the market. According to the embodiment illustrated in FIG. 3, the indicator 308 is used to display the total number of working orders, i.e., orders not filled, that a trader has currently on the market. It should be understood that in addition to or instead of displaying the total number of working orders, a trader's total working quantity could be displayed as well. The total working quantity would represent the total unfilled quantities of all orders that the trader has currently entered, but that haven't been filled in the market.

The net position ("POS") indicator 304 displays a numerical value associated with a net position that a trader has in the market. A net position is a difference between the total open long position and the total open short position of a tradable object held by a trader. For instance, if a trader has bought 12 more contracts of a tradable object than the trader has sold, then the trader's net position would be 12. Similarly, if a trader has sold 12 more contracts of a tradable object than the trader has bought, then the trader's net position would be −12.

Further, the P/L indicator 302 displays a trader's profit or loss value associated with the tradable object. Many formulas can be used to calculate trader's profit and loss. In one embodiment, for example, the profit or loss may be calculated by subtracting the total sell price from the total buy price, and then subtracting the cost of closing a position, market fees, or any other transaction costs. It should be understood that many different formulas could be used to calculate the profit/loss value, and, thus, a number displayed in the conjunction with the P/L indicator 302 may be calculated using any equation configurable by a trader. For instance, the cost to close a position may be calculated using different prices such as a current inside market price, a settlement price, or any theoretical price selected by a trader. Additionally, exchange fees or any other user configurable fees could be also included into the profit related calculations.

The market map interface may also include one or more theoretical value indicators. The graphical interface 300 in FIG. 3 illustrates two such theoretical value indicators 314 and 320 corresponding to a theoretical ask indicator and a theoretical bid indicator, respectively. In the example embodiment, the theoretical indicators are associated with a price. However, it should be understood that theoretical indicators could be associated with any other item of interest to a trader. Further, it should be understood that additional theoretical indicators could be displayed as well. For instance, one or more theoretical indicators for the inside market could be displayed as well.

It should be understood that a theoretical value for any desired item of interest to a trader may be set by a trader or by the third party software. For example, a trader may copy and paste information from a spreadsheet. However, it should be understood that other methods of transferring information may be used as well.

For example, a link can be available from the graphical interface 300 that may enable a trader to initiate copying and pasting information from a spreadsheet. It should be understood that a trader may be provided with a window enabling the trader to link third party software to the graphical interface 300. For instance, a trader may want to monitor a specific price level. Alternatively, the trader may want to monitor a dynamic price level that is based on the attached calculation. It should be understood that the indicators are not limited to the use with prices, and may be used with any items of interest on the interface 300. In one embodiment, the trader may copy one or more desired cells from a spreadsheet and paste the spreadsheet cells on the static axis 330 of the interface 300. Upon pasting one or more spreadsheet cells, one or more theoretical indicators can be displayed on or in association with the static axis 330, and positions of the theoretical indicators may then correspond to prices calculated in the spreadsheet or other software. It should be understood that theoretical indicators may be displayed using a predetermined, user-configurable color differentiating the theoretical indicator from other trader-related or order-related indicators.

For instance, a link may be established from the attached spreadsheet cell(s) to the spreadsheet from which one or more cells were copied. In such an embodiment, the link gives a trader the ability to change the copied value or the equation in the spreadsheet, resulting in changes of indicators' positions. It should be understood that any desirable data exchange protocol could be used to embed information from the third party software or to link a specific indicator on the market map to the third party software. For example, Microsoft OLE 2.0 may be used to perform these functions when using Microsoft Windows applications as the third party software. For example, Microsoft OLE 2.0 may be used to perform these functions when using Microsoft Windows applications as the third party software. In a preferred embodiment, Microsoft OLE may be used to provide a link between any market indicator or a number displayed in relation to the market map and a cell from a Microsoft EXCEL spreadsheet. Data exchange protocols in general, and linking and embedding techniques in particular, are well known to those skilled in the art. Further, it should be understood the every time a variable in the equation changes, and a new value is calculated, the indicator linked to the equation may be dynamically adjusted based on the new value.

For instance, the link between the market map interface and the third party software may be a two-way link. In an embodiment in which market information, such as the last traded price, for instance, or any other item of interest, is used as a variable in the equation in the spreadsheet, the market data from the market map interface 300 may be linked to the spreadsheet application or any other third party software. Further, it should be understood that the market map application may be linked to the trading application, so that any data available to the market map or the trading application may be linked to the spreadsheet.

It should be understood that the interface 300 illustrated in FIG. 3 is not limited to displaying the indicators described above, and more, fewer, or different indicators could be displayed as well. Additionally, it should be understood that a trader may control, e.g., configure, which indicators are displayed on the interface 300. It should also be understood that the present invention is not limited to the format of the graphical indicators illustrated in FIG. 3. In one embodiment, a trader could configure a format of each indicator or a color used for each indicator via a window interface enabling the trader to select indicators to be displayed on the graphical interface via the market map, and further to select a graphical representation for each indicator.

Further, in addition to dynamically displaying current market information and trader-related information indicators, the interface 300 may also display historical data related to any market item associated with the tradable object. According to one embodiment illustrated in FIG. 3, the historical data may be displayed in a graphical format, such as using a bar chart, for instance, as illustrated at 328, where the bar chart is displayed in relation to the price axis 330. Using a bar chart, each bar may represent a price fluctuation during a predetermined period of time, which may be user configurable. For example, each bar may correspond to a month, an hour, a minute, or a few seconds. Alternatively, each bar may be created upon detecting a certain condition such as market volatility, reaching a new market high or low, for example.

Using a bar chart, the upper and lower range of each bar is determined based on a difference between the highest and lowest value of the item of interest. According to one embodiment, the bar chart 328 may display the last traded price of the tradable object during a predetermined period of time. For example, if a bar corresponds to a one-hour time period, the bar may represent the last traded price performance during that one hour time period, and the upper and lower range of the bar may correspond to the difference between the highest and lowest last traded prices during the one hour time period. Additionally, the bar chart 328 may plot where a trader placed buy and sell orders, and at what price the orders got filled in relation to each bar corresponding to the last traded price. It should be understood that the present invention is not limited to displaying historical data of any item of interest using a bar chart, and different types of charts could also be used. Additionally, it should be understood that a trader may enable or disable the chart display, and the trader may control which items of interest are displayed in the chart. Additionally, the market map 300 may also display a horizontal bar chart indicating current volume by price.

It should be understood that the market map application may dynamically display on each graphical interface in relation to the axis any changes related to market information and trader-related information associated with a tradable object. For instance, any time the trading application detects a change in market information or detects a new bid or ask being placed by a trader via a trading interface, the market map application may also dynamically receive that information so that any relevant changes in the market and trader-related information are dynamically updated and displayed via the market map interface. Further, the market map interface could also display market depth, and a trader may configure how much of the market depth is displayed on each graphical interface being displayed on the market map. Additionally, it should be understood that a trader may control display of different indicators on the market map via a parameter entry window, via which the trader may enter any desirable parameters or select which indicators are displayed on the each graphical interface associated with the market map.

Further, it should be understood that a trader could also place orders via the market map interface. For instance, a special buy or sell indicator could be displayed in association with graphical interfaces associated with a plurality of tradable objects, and, when selected, would enable a trader to place the order via the market map. Alternatively, a trader could place a sell or buy order by clicking on a predetermined side of the graphical interface, such as, for example, if a trader clicks along the right side of a graphical interface, placing of a buy order may be initiated. Alternatively, any key combination, that may be user configurable, may initiate placing a buy or sell order. Further, alternatively, a right mouse click may correspond to initiating a placement of a buy order, and left mouse click may correspond to a sell order. It should be understood that the order quantity may be specified via many means. For instance, a trader may configure his preferable quantity indicators to be displayed in association with the market map interface. Alternatively, a buy or sell indicator, when selected by a trader, may activate a window interface, via which the trader may specify a desired quantity.

Further, it should be understood that the example graphical interface 300 is not limited to displaying indicators related to a single tradable object. It should be understood that, in an alternative embodiment, market/trader information and indicators related to two or more tradable objects may be displayed in relation to a single axis, such as the axis 330. In such an embodiment, for example, a user may configure the indicators in such a manner so that he/she can easily distinguish which indicators correspond to which tradable object.

Figure 4:
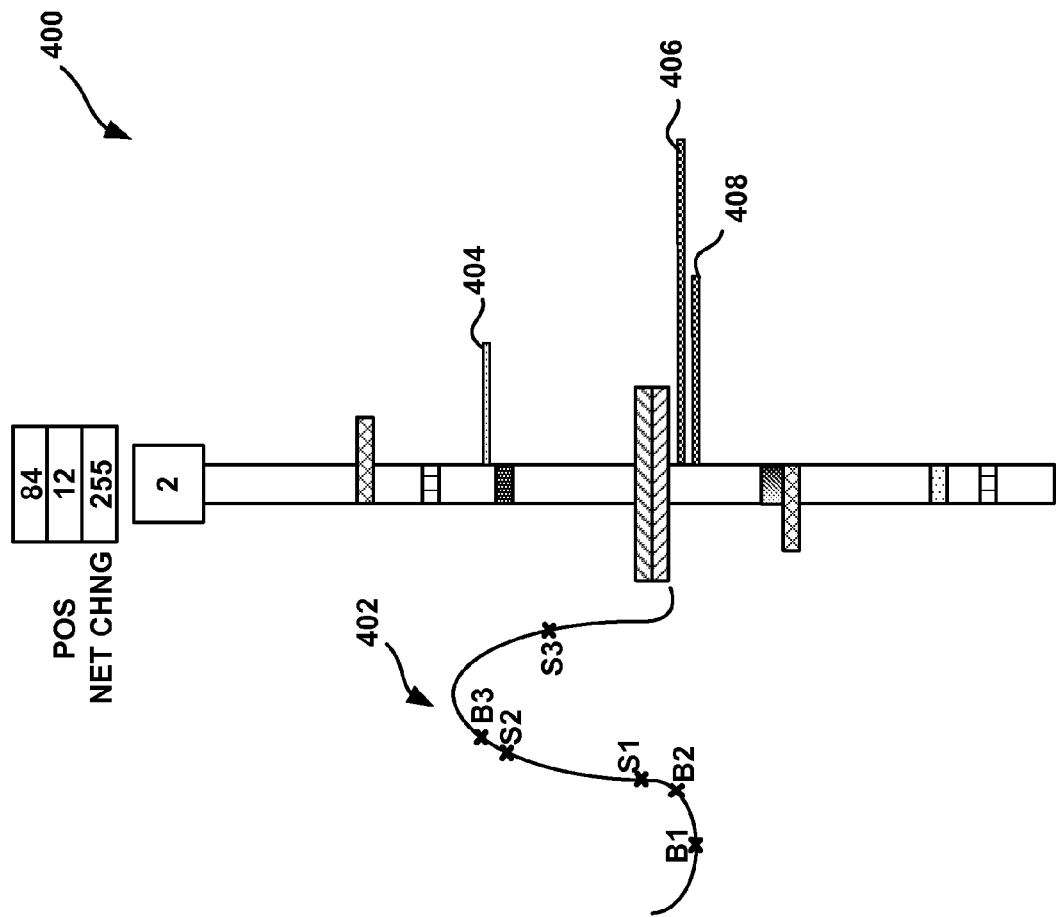
FIG. 4 is a block diagram illustrating a graphical interface for displaying trader-related historical data including trader's profit and loss information via the market map.

FIG. 4 is a block diagram illustrating one example graphical interface 400 that may be displayed via the market map according to one embodiment for displaying trader-related historical data and, specifically, trader's profit and loss data. As illustrated in FIG. 4, a time-based graph 402 may be displayed in relation to the graphical interface indicating relative price levels of each transaction. For instance, according to the graph 402, the trader purchased a predetermined quantity at B1 and sold that quantity at a higher price S1. The profit made on this transaction is illustrated with a graphical bar 408 that is displayed at the buy price level. Similarly, another profit graphical bar 406, corresponding to the buy at the price B2 and the sell at the price S2, is illustrated at the buy price level. It should be understood that the profit and loss bars may be displayed using different color bars. For instance, as illustrated in FIG. 4, a loss bar 404 corresponds to losses incurred in buying a certain quantity of the tradable object at the buy price B3 and selling that quantity at the sell price S3. It should be understood that the length of each bar may correspond to the loss or profit incurred relatively to other trades so that a trader can quickly attest his position throughout the trading day. For example, the length of the first bar corresponding to the first transaction of the user may be user configurable so that, for example, the length of each bar corresponding to subsequent transactions may be determined based on the length of the bar corresponding to the first transaction.

FIG. 4 illustrates profit/loss bars displayed on one side of the graphical interface. In an alternative embodiment, profit/loss bars corresponding to transactions that have been initiated with buys may be displayed on one side of the graphical interface, while the bars corresponding to transactions that have been initiated with sells may be displayed on the other side of the graphical interface.

Further, it should be understood that all or some buy and sells, such as buy and sells that occurred over a predetermined period of time, may be averaged, so that only one profit or loss bar is displayed for each predefined time period. It should be understood that other embodiments are possible as well. Additionally, any method for linking a buy and a sell may be used to determine a profit or a loss for a pair of trades. For example, if a last in first out ("LIFO") algorithm is used, the first sell may be matched with the last buy. Alternatively, if the first in first out ("FIFO") algorithm is used, the first sell may be matched with the first buy. It should be understood, however, that different embodiments are possible as well.

A trader may simultaneously trade multiple tradable objects and may participate in multiple markets. For example, if a trader is interested in three tradable objects that are traded on the same or different exchanges, a trader may wish to view multiple graphical interfaces related to these tradable objects via a single market map interface. Further, in such an embodiment, a trader may believe that there is a relationship, such as a price relationship, between two or more tradable objects being displayed via graphical interfaces on the market map interface. In such an embodiment, a trader may link, for example, two tradable objects and enter an adjustment parameter, such as an offset, an equation or any other user defined formula that may characterize a trader-defined relationship between two tradable objects. Then, as will be described in greater detail below, when one graphical interface is adjusted upon, for example, receiving a user input, indicators associated with the linked tradable object and displayed in relation to another graphical interface may be accordingly repositioned based on the adjustment parameter specified by the trader for the two tradable object. It should be understood that repositioning of the indicators does not mean that the movement of the indicators. According to the example embodiments, and as will be described in greater detail below, the indicators stay at the same level of the axis, and it is the relative view of the axis that changes.

Further, it should be understood that two or more tradable objects can be linked together, and the user may define an adjustment parameter for each pair of tradable objects in the linked group. Alternatively, for example, a user may center one graphical interface associated with a first tradable object, and then may enter a user input, such as a graphical selection input, or any other user configurable input, causing the other linked graphical interface to be repositioned according to some preset adjustment parameters.

As mentioned in the preceding paragraph, an adjustment parameter defining a relationship between two tradable objects may be user configurable, and may take a format of an offset, an equation, or any formula. It should be understood that the particular form of the offset may be dependent upon the relationship between the tradable objects that are being displayed. For example, the offset may take any form that corresponds to a trader-defined relationship between the tradable objects. For example, an offset may be a multiplier or divisor, or a fixed number that may be added or subtracted from a certain price level.

An equation, function, or user defined formula may define a mathematical relationship among the linked tradable objects and may include a plurality of factors such as factors based on data available from an exchange, for example. Further, in an embodiment in which tradable objects trade with different tick sizes, the equation may perform a rounding function to determine an adjustment of a graphical interface associated with one tradable object relatively to a second linked graphical interface associated with a second tradable object. In one embodiment, a trader may enter an equation or a function via third party software, such as a spreadsheet, and the equation may be linked to the market map application. In such an embodiment, if one or more variables of an equation or a function depend on any information available to the market map application, the market map application may provide that information to the third party software so that the adjustment parameter is dynamically calculated, and one or more graphical interfaces being displayed on the market map interface may be repositioned accordingly. It should be understood that a window interface may be provided to a trader to enable the trader to link the third party software application to the market map application.

Preferably, according to one example embodiment, when a trader trades multiple objects, the trader may specify which of these tradable objects are displayed via the market map interface. It should be understood that when a trader enables the market map application, a window interface may be provided to the trader so that the trader can select tradable objects, and information related to the selected tradable objects may be displayed via a plurality of graphical interfaces via the market map interface. Further, it should be understood that a trader does not necessarily have to trade a tradable object to view information related to such a tradable object via the market map interface. The ability provided to a trader to view market data related to one or more tradable objects in relation to one or more other related tradable objects may cause a trader to start trading those tradable objects.

Further, when a trader selects tradable objects to be displayed via a market map interface, the trader may effectively "link" or "group" the tradable objects for the purposes of repositioning of graphical interfaces associated with the linked tradable objects in relation to each other. In such an embodiment, and as will be described in greater detail below, when a user repositions information being displayed via one market map, the information being displayed on other market maps that are linked to the repositioned market map may also be repositioned accordingly based on one or more adjustment parameters, function, or formula entered by the user.

It should be understood that a trader may choose to have one or more graphical interfaces related to one or more tradable objects ignore the repositioning. In such an embodiment, the trader may simply skip such tradable objects when defining the linkage between the graphical interfaces. Alternatively, a window interface may include an "ignore" selection input, or any similar designation, via which a trader may indicate market maps that should not be repositioned in relation to any other market maps. It should be understood that other grouping methods could also be used, and the present invention is not limited to the described methods. Further, it should be understood that when a trader links two or more tradable objects, the market map interface may automatically display graphical interfaces associated with the linked tradable objects in relation to one another so that a trader can easily view data related to the linked tradable objects.

It should be understood that a plurality of graphical interfaces, displayed via a market map interface, may display information related to the same tradable object, but each graphical interface may correspond to a different contract expiration date. However, it should be understood that the present invention is not limited to linking the same tradable objects that have different expiration dates. Any two or more tradable objects may be linked. Referring back to the example of linking the same tradable objects but having different expiration dates, for instance, one graphical interface may display information associated with a tradable object having a contract expiration date in March, while a second graphical interface may display information associated with the same tradable object, but having a contract expiration date in September of the same year or a different year. Further, it should be understood that graphical interfaces on the market map interface may display information related to the same tradable object being traded at the same or different exchanges. Further, alternatively, graphical interfaces being displayed via the market map may display information related to different tradable objects being traded at the same or different exchanges.

When a trader links two or more graphical interfaces and defines one or more adjustment parameters, based on which the graphical interfaces should be repositioned, the trader may control which one of the two graphical interfaces is a master graphical interface (e.g., a graphical interface based on which the other linked graphical interface, a slave graphical interface, may be repositioned). For example, when a trader initiates repositioning of data being displayed via one of the linked graphical interfaces on the market map, the market map application may automatically designate the selected graphical interface as a master graphical interface for this specific repositioning being performed by the trader. Thus, when the trader repositions information being displayed via the selected graphical interface, information being displayed on the other linked graphical interfaces may be repositioned according to adjustment parameter(s), equation (s), or formula (s) entered by the trader for each pair of the linked graphical interface group. Thus, it should be understood that, in such an embodiment, any linked graphical interface in a group of the linked interfaces may be a master graphical interface depending on which graphical interface a trader decides to reposition.

Also, it should be understood that a trader may reposition a graphical interface thus causing repositioning of the linked graphical interfaces by scrolling one of the borders of the selected graphical interface to a desired position, while viewing the effect of repositioning of the displayed indicators. Alternatively, up and down movement indicators may be displayed aside each graphical interface, and may be used to display a different view of the same information. Further, it should be understood that a trader may enter a predetermined key input to automatically reposition, such as re-center, one graphical interface, based on which one or more other graphical interfaces may be repositioned accordingly. For example, if an initial scale range of the selected graphical interface is 80-120, and one or more market information indicators is getting out of the upper viewable range, the trader may reposition the graphical interface to display the range 100-140. Based on that repositioning, it might seem that the indicators have been repositioned; however, it is only the relative view of the indicators to the scale what has actually changed. Other linked graphical interfaces may be repositioned accordingly based on one or more user configured formulas, offsets or functions.

Alternatively, the linked graphical interfaces may be repositioned upon detecting a user input, such as selecting a predetermined graphical selection input or a key combination. Further, alternatively, a trader may enable an automatic repositioning of the linked graphical interfaces. In such an embodiment, one or more graphical interfaces may be automatically repositioned, causing automatic repositioning of other linked indicators, when on or more indicators (configurable by a user, for example) move out of the viewable area of the graphical interface. It should be understood that other embodiments are possible as well.

Figure 5:
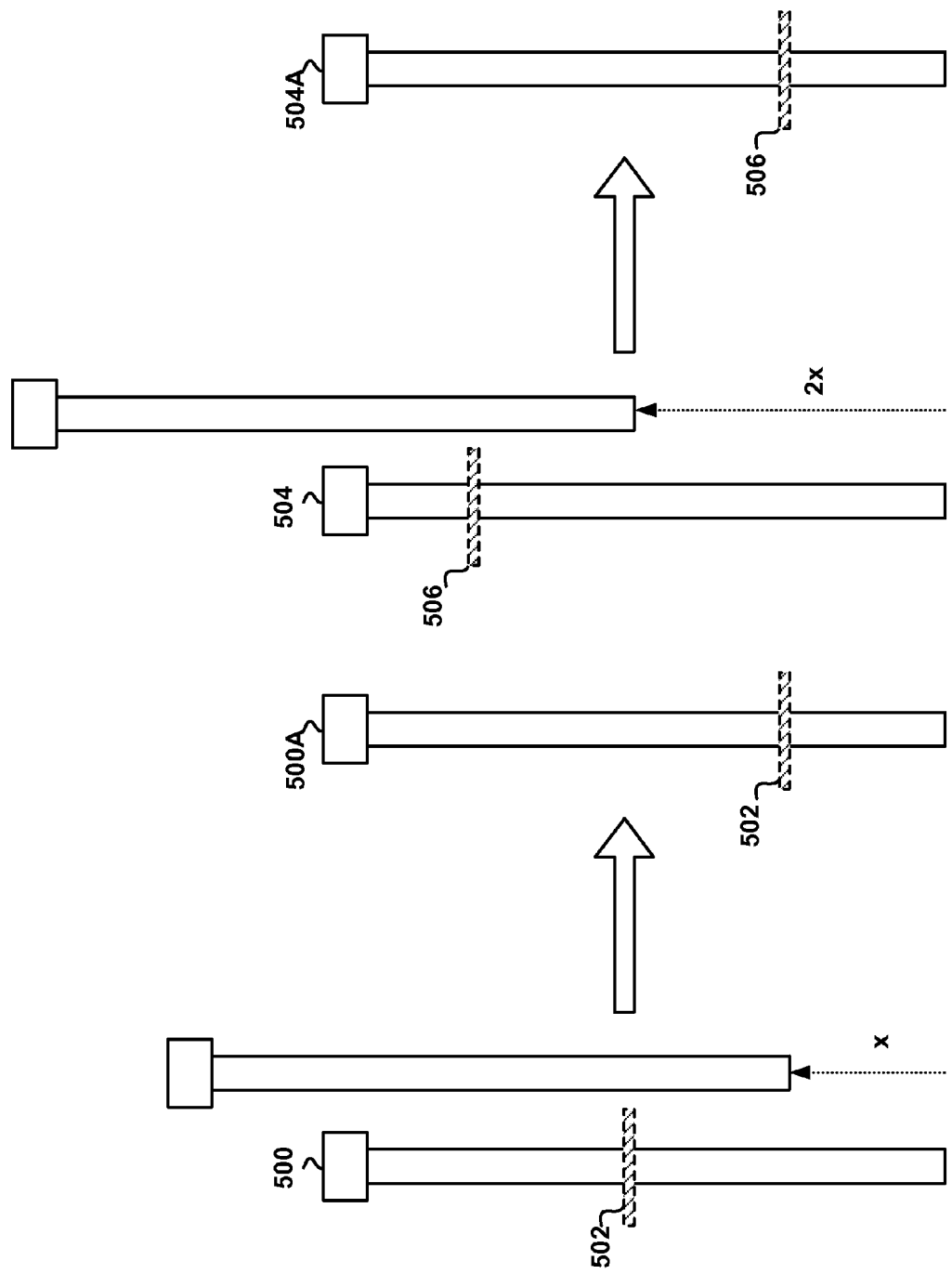
FIG. 5 is a block diagram illustrating a method for repositioning of graphical interfaces on the market map in accordance with one embodiment.

FIG. 5 is a block diagram illustrating one example method for repositioning of graphical interfaces on the market map interface in accordance with one embodiment. For the ease of presentation, each graphical interface illustrates only one indicator. However, it should be understood, and as described in reference to FIG. 3, each graphical interface being displayed via the market map may display more than one indicator associated with market information or trader related information.

Referring to FIG. 5 two graphical interfaces, a first graphical interface 500 and a second graphical interface 504 are illustrated. For instance, a trader may designate the first graphical interface 500 as a master graphical interface by selecting a predetermined selection input, key combination, or by initiating a repositioning, e.g., scrolling using a mouse, for example, of one of the lower (or upper) borders of the graphical interface 500 in direction of the desired movement. Further, in FIG. 5, it is assumed that the trader has earlier defined a (tick) ratio or a formula defining an adjustment parameter between the two graphical interfaces. In the example illustrated in FIG. 5, the adjustment ratio between the first graphical interface 500 and the second graphical interface 504 is 1:2, where 1:2 may correspond to a tick ratio, for instance. Thus, when a trader decides to change a view of the first graphical interface and scrolls the first graphical interface 500 "x" ticks up (as illustrated in FIG. 5), thus, effectively, keeping the same tick range, but changing the lowest and highest displayed range of values on the axis, the graphical interface 500 may be displayed as illustrated in the graphical interface 500A. Therefore, if the highest range value of the graphical interface 500 was "H" and the lowest value was "L," after the movement, the highest value of the graphical interface 500A would have been "H+x" and the lowest value would have been "L+x," while the indicator 502 would have stayed at the same level (e.g., a tick level, or a price level). It should be understood that the intermediate stage of the graphical interface 500 has been illustrated in FIG. 5 to show the repositioning of the graphical interface in relation to the indicator 502; however, it should be understood that this view would not be presented to a user.

Further, if the first graphical interface 500 is moved "x" ticks up, the second graphical interface 504 may be moved "2x" ticks up based on the adjustment parameter defined by the user, resulting in the graphical interface 504A. As mentioned earlier, the adjustment of the second graphical interface 504 may occur upon detecting the repositioning of the first graphical interface 500, or upon receiving a predetermined user selection input. It should be understood that it is only the view of the graphical interface that changes, and not positions of the graphical indicators being displayed on the interfaces. Thus, each linked graphical interface being displayed via the market map may be thought of as a moving window so that, when one graphical interface is repositioned, thus, changing the view of the indicators displayed on that graphical interface, the view of one or more other graphical interfaces change as well according to trader-defined adjustment parameters or formulas.

Further, as explained above, the selected graphical interface, e.g., the graphical interface based on which the other linked graphical interfaces are repositioned, serves as a master graphical interface only for duration of this repositioning. When a trader decides to reposition the graphical interface once again, the trader may initiate repositioning of another graphical interface, causing the selected graphical interface to serve as a master graphical interface.

It should be understood that the present invention is not limited to manually repositioning graphical interfaces. In an alternative embodiment, each graphical interface may provide a selection graphical input that a trader may enable to automatically reposition the graphical interface, such as automatically center indicators displayed in association with the graphical interface. In such an embodiment, if a trader selects such an input, the graphical interface associated with the selected graphical input may be automatically designated as a master graphical interface for the linked graphical interfaces.

It should be understood, and as mentioned above, a market map may display a plurality of graphical interfaces, and the graphical interfaces may be grouped so that for example two or more graphical interfaces displayed in one row are linked together, and another set of graphical interfaces, displayed in a second row, for example, are linked as well. Further, it should be understood that many additional user configurable options may be available as well. For example, when one or more graphical interfaces are repositioned, the graphical interface may display a highlighted indicator identifying where one or more indicators were positioned prior to the repositioning.

As mentioned in reference to the preceding paragraphs, the adjustment parameter that is used to adjust position of one graphical interface in relation to another graphical interface being displayed on the market map interface may be a numerical value. In one embodiment, a numerical value may define an offset to be used to adjust a relative position of indicators being displayed on the slave graphical interfaces in relation to the respective indicators being displayed on the master graphical interface. For example, if two graphical interfaces display information related to the same tradable object that has different contract expiration dates, the two graphical interfaces are most likely based on the same price scale. In such an embodiment, the price of the tradable object having an earlier contract closing date may be lower than that of the tradable object having a later closing date. For example, if P1 is the lower price, and P2 is the higher price, P2 might be set to "P1+X", where "X" is an offset and may be user configurable. Further, in such an embodiment, the offset may correspond to a tick offset that may be used in the market map application to adjust positions of indicators on the second graphical interface in relation to positions of indicators on the first graphical interface. In other words, P2 is a function of P1, e.g., P2=f(P1).

For example, referring to the example discussed above, if the offset is set to 10 ticks, market information and trader related information on two graphical interfaces may be adjusted so that the offset between the second graphical interface and the first graphical interface is 10 ticks. Then, for example, if the graphical interface associated with P1 is repositioned two ticks down, the second graphical interface, upon receiving a user selection input, for example, may be repositioned accordingly to keep the offset equal to 10.

However, it should be understood that graphical interfaces on the market map may also display information associated with tradable objects having different price scales. In such an embodiment, a trader may define a tick or price ratio for a pair of linked graphical interfaces, the embodiment of which will be discussed in reference to the next figure.

Figure 6:
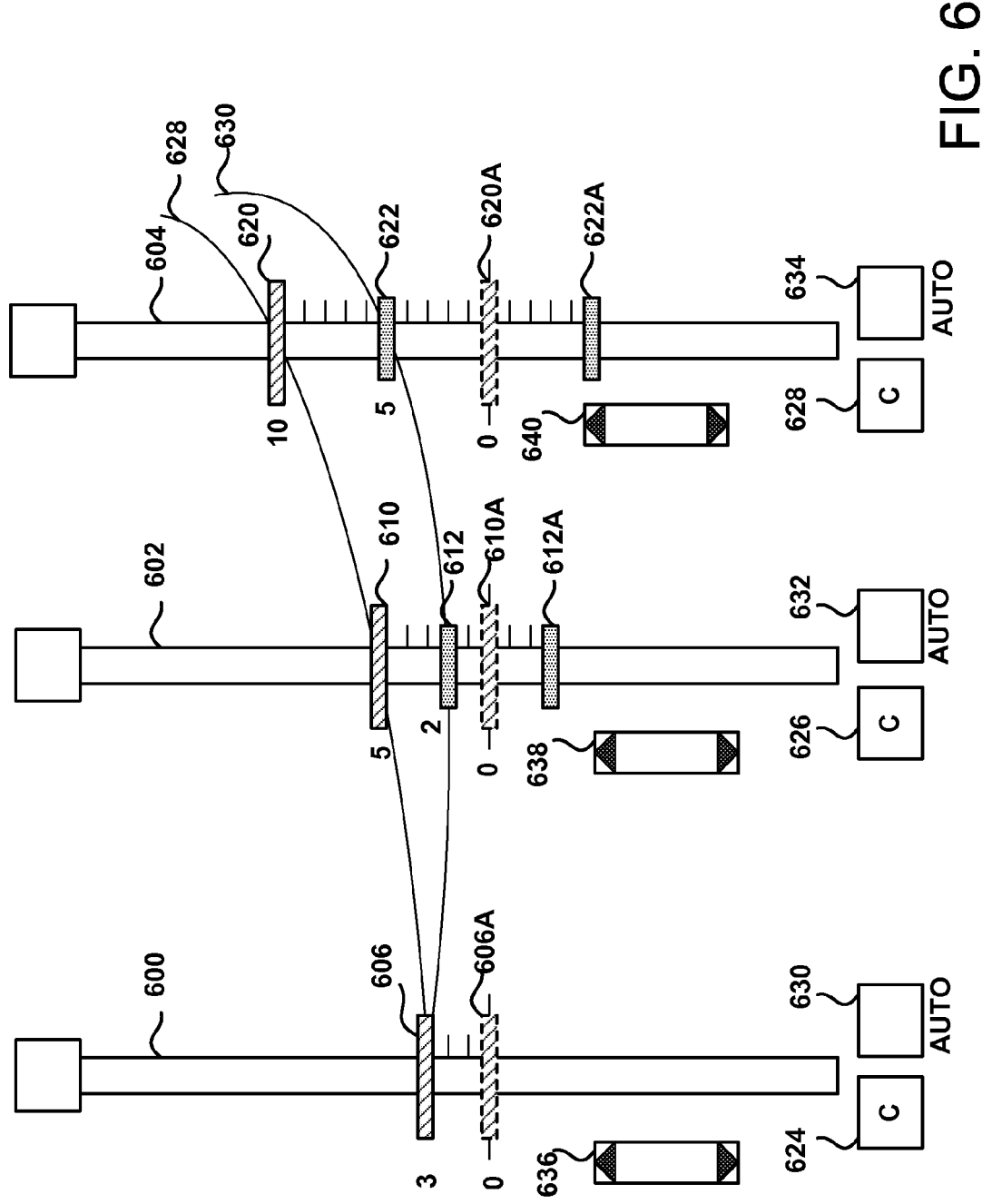
FIG. 6 is a block diagram illustrating one embodiment for repositioning graphical interface's indicators based on relative tick ratios configurable by a user.

FIG. 6 illustrates a method for repositioning graphical interfaces on the market map based on relative tick ratios configurable by a user. For the ease of presentation of relative movements of slave graphical interfaces' indicators relative to the corresponding master graphical interface's indicator, each graphical interface illustrated in FIG. 6 includes only one indicator. However, it should be understood, and as described in reference to FIG. 3, each graphical interface may display more than one indicator associated with market information or trader-related information.

Referring to FIG. 6, three graphical interfaces: a first graphical interface 600, a second graphical interface 602, and a third graphical interface 604 are illustrated. For instance, a trader may designate the first graphical interface 600 as a master graphical interface by simply initiating the repositioning process, e.g., scrolling an upper or lower edge of the graphical interface to a desired position. Alternatively, a trader may re-center one or more graphical interfaces displayed via the market map by selecting a re-center graphical indicator such as a graphical indicator 624, 626, or 628. Alternatively, as has been described in earlier paragraphs, a trader may select an automated repositioning by selecting one of the auto selection inputs 630, 632, or 634. In such an embodiment, for example, if the auto selection input 630 is selected, the first graphical interface may be periodically centered causing the other two interfaces to be repositioned according to user-defined adjustment parameters. Alternatively, the other interfaces are not repositioned until a predetermined selection input is received from the user.

Also, the trader may define tick ratios to be used to control repositioning of each pair of the linked graphical interfaces. For instance, the trader may define that 3 ticks on the graphical interface 600 correspond to 5 ticks on the graphical interface 602 (a ratio 5:3 for the first pair of graphical interfaces 600 and 602), and then may define that the same 3 ticks on the graphical interface 600 correspond to 10 ticks on the graphical interface 604 (a ratio 10:3 for the second pair of graphical interfaces 600 and 604). It should be understood that a third ratio could be defined for the graphical interfaces 602 and 604 as well.

In such an embodiment, if a trader repositions the market map 600 by 3 ticks up or down, the graphical interfaces 602 and 604 are repositioned 5 and 10 ticks up or down, respectively. As mentioned in earlier paragraphs, a trader may reposition the graphical interface by simply scrolling an upper or lower edge of the graphical interface, or alternatively by moving a sliding scale 636 enabling a trader to reposition the graphical interface 600. Similarly, the trader may reposition the graphical interfaces 602 and 604 using sliding scales 638 and 640, respectively, and causing relative repositioning of the other market maps based on the defined ratios.

Thus, for example, an indicator 606 is positioned at a third tick from the common level line illustrated as a tick labeled "0." When a trader repositions the graphical interface 600 3 ticks down, thus effectively moving the indicator 606 to the position 606A, the graphical interfaces 602 and 604 are repositioned accordingly based on the predefined ratios, e.g., 5 and 10 ticks down. Thus, after the repositioning, an indicator 612 on the graphical interface 602 is displayed as an indicator 612A, and an indicator 622 on the graphical interface 604 are displayed as an indicator 622A, respectively. FIG. 6 shows two indicators 606 and 606A, 612 and 612A, and 622 and 622A on the three market maps. However, it should be understood that once the repositioning occurs, the indicators 606, 612, and 622 are no longer displayed.

It should be understood that once a master graphical interface is repositioned, the other linked graphical interfaces may be repositioned instantly or may be repositioned upon receiving some selection input. Further, a trader may control how fast slave graphical interfaces are repositioned. For instance, according to one embodiment, instead of moving the slave graphical interface instantly, repositioning of slave graphical interfaces may occur in a slowed down motion. Further, alternatively, slave graphical interfaces, once repositioned, may return, after some user-configurable time, to their original views, e.g., views before the repositioning. It should be understood that those skilled in the art should understand that many other embodiments are possible as well.

According to one example embodiment, the slave graphical interfaces, e.g., the graphical interfaces 602 and 604 in this example, may also display theoretical positions of any indicators. Referring to FIG. 6, an indicator 606 is displayed in relation to the graphical interface 600. Based on the position of the indicator 606 and any user-defined formulas, positions of the theoretical indicators on the other graphical interfaces corresponding to the indicator 606 may be determined and then displayed on the graphical interfaces 602 and 604, respectively. According to an example embodiment, a first theoretical indicator 610 is positioned at a tick labeled "5" from the common level line on the graphical interface 602, and a second theoretical indicator 620 is positioned at a tick labeled "10" from the common level line on the graphical interface 604.

However, a theoretical indicator defining position of the inside market, for instance, may not, and probably will not, match position of an inside market indicator as determined by the market activities. Therefore, while the indicators 610 and 620 correspond to positions of theoretical indicators, market-based indicator 612 and 622 are displayed on the graphical interfaces 602 and 604, respectively.

Further, according to an example embodiment, two or more curves may be displayed to quickly enable a trader to view the current position of an item of interest with respect to the theoretical position of that item. FIG. 6 illustrates two such curves, where a first curve 628 traces theoretical positions of the items of interest as displayed on three graphical interfaces, and a second curve 630 traces the market-based positions of the items of interest. It should be understood that once the indicators are repositioned, the curves tracing the indicators are updated as well and reflect positions of the updated indicators. FIG. 6 does not illustrate the updated curves. The curves displayed in relation to the market maps may aid a trader to adjust his trading strategies and view the market trend in relation to the theoretical market position set by a trader. It should be understood that more than one theoretical indicator could be displayed for the same item of interest, and more than one curve could be displayed in relation to those theoretical values.

Further, it should be understood that the method for repositioning market information or trader-related information on slave graphical interfaces displayed via the market map is not limited to using user-defined numerical offsets or ratios. In an alternative embodiment, a user may define a function or a formula having a plurality of parameters based on which an adjustment parameter for adjusting each slave graphical interface may be calculated. In such an embodiment, a trader may enter one or more functions via third-party software that is linked to the market map application and which dynamically calculates an adjustment parameter that is used to reposition any indicators on slave graphical interfaces relative to a master graphical interface. It should be understood that any user configurable functions could be used to determine an adjustment parameter.

Further, it should be understood that more than one adjustment parameter could be used for each pair of graphical interfaces. For instance, a plurality of graphical selection inputs, such as window buttons, associated with different adjustment parameters may be displayed for each pair of graphical interfaces. Alternatively, different key inputs may correspond to different adjustment parameters. In such an embodiment, a trader may select one of such selection inputs before any repositioning is performed. Further, in such an embodiment, after some time, a trader may subsequently select another graphical selection input associated with a different adjustment parameter so that the repositioning may be performed based on a different adjustment parameter.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

Further, it will be apparent to those of ordinary skill in the art that methods involved in the system and method for repositioning information displayed on the market map may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A non-transitory computer readable medium having instructions stored therein, which when executed by a processor cause the processor to carry out acts comprising:
receiving a user command via a user input of a computing device to shift a first plurality of axially aligned price levels for a first tradable object a number of price levels, where a first indicator is aligned along the first plurality of axially aligned price levels according to first market information for the first tradable object; and
shifting via the computing device a second plurality of axially aligned price levels for a second tradable objet in response to receiving the user command, where a second indicator is aligned along the second plurality of axially aligned price levels according to second market information for the second tradable object, where the second plurality of axially aligned price levels is shifted according to a predetermined repositioning ratio including any of an offset parameter, a tick-based ratio, and a price-based ratio.

2. The non-transitory computer readable medium of claim 1 where the predetermined repositioning ratio defines a relative repositioning movement between the first market information and the second market information.

3. The non-transitory computer readable medium of claim 1 where the acts further comprise determining the repositioning ratio according to at least one formula.

4. The non-transitory computer readable medium of claim 1 where the repositioning ratio is user configurable.

5. The non-transitory computer readable medium of claim 1 where the acts further comprise automatically shifting the second plurality of axially aligned price levels.

6. The non-transitory computer readable medium of claim 1 where the acts further comprise automatically repositioning the first plurality of axially aligned price levels.

7. The non-transitory computer readable medium of claim 1 where the acts further comprise repositioning the second plurality of axially aligned price levels in response to a user-initiated command.

8. A method comprising:
receiving a user command via a user input of a computing device to shift a first plurality of axially aligned price levels for a first tradable object a number of price levels, where a first indicator is aligned along the first plurality of axially aligned price levels according to first market information for the first tradable object; and
shifting via the computing device a second plurality of axially aligned price levels for a second tradable objet in response to receiving the user command, where a second indicator is aligned along the second plurality of axially aligned price levels according to second market information for the second tradable object, where the second plurality of axially aligned price levels is shifted according to a predetermined repositioning ratio including any of repositioning ratio comprises any one of an offset parameter, a tick-based ratio, and a price-based ratio.

9. The method of claim 8 where the predetermined repositioning ratio defines a relative repositioning movement between the first market information and the second market information.

10. The method of claim 9 further comprising determining the repositioning ratio according to at least one formula.

11. The method of claim 9 further comprising determining the repositioning ratio according to at least one formula.

12. The method of claim 8 where the repositioning ratio is user configurable.

13. The method of claim 8 further comprising automatically shifting the second plurality of axially aligned price levels.

14. The method of claim 8 further comprising automatically repositioning the first plurality of axially aligned price levels.

15. The method of claim 8 further comprising repositioning the second plurality of axially aligned price levels in response to a user-initiated command.

16. The method of claim 8 where the repositioning ratio is user configurable.

17. A method comprising:
shifting via a computing device at least one a plurality of displayed plurality of axially aligned price levels in response to repositioning another one of the plurality of displayed plurality of axially aligned price levels, where each of the plurality of axially aligned price levels is associated with a corresponding tradable object and includes an indicator displayed along said each of the plurality of axially aligned price levels according to market information for the corresponding tradable object.

18. The method of claim 17 further comprising receiving a user command via a user input of a computing device to shift the at least one of the first plurality of axially aligned price levels.

19. The method of claim 17 where the predetermined repositioning ratio defines a relative repositioning movement between the first market information and the second market information.

* * * * *